July 7, 1925.

W. C. STEVENS

STAPLING MACHINE

Filed March 27, 1922  6 Sheets-Sheet 1

Inventor
William C. Stevens

July 7, 1925.

W. C. STEVENS

1,545,460

STAPLING MACHINE

Filed March 27, 1922 6 Sheets-Sheet 5

Inventor
William C. Stevens
By G. L. Cl
Attorney

Patented July 7, 1925.

1,545,460

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

STAPLING MACHINE.

Application filed March 27, 1922. Serial No. 547,122.

*To all whom it may concern:*

Be it known that I, WILLIAM C. STEVENS, a citizen of the United States, residing at Akron, in the county of Summit, State of Ohio, have invented certain new and useful Improvements in Stapling Machines, of which the following is a specification.

My invention relates to improvements in stapling machines for use in forming beads for pneumatic tires.

Tire beads, of the type usually incorporated in the bead portions of clencher tires, are commonly formed from a strip of bead material the ends of which must be joined together to produce the core in its final annular shape, and it has been found that this operation may be advantageously performed by driving a staple through the abutted ends of the strip and clenching the ends of the staple against one side of the bead.

My invention is directed toward providing a machine, for accomplishing the above described operations, which is particularly characterized by simplicity of structure when compared with existing mechanism designed for like purposes.

It is also a particular object of the invention to provide against jamming of certain units of the machine whereby breakage of the various mechanisms is obviated, and the life of the entire machine prolonged.

With these and other objects in view the invention resides in the combination of mechanical units, and the arrangement and structure of their component elements, as hereinafter described in detail, in their preferred embodiment, and emphasized in the claims appended hereto.

In the drawings accompanying and forming a part of this specification.

Referring to the drawings, by characters of reference, the machine therein disclosed may be briefly described as comprising, a bead gripping unit A, a staple feeding unit B, a staple driving unit C, and a driving unit D, for actuating the aforesaid units A and C.

All of these units may be supported, in their assembled relation, upon a frame of any suitable construction, for instance, that shown in Fig. 1 of the drawings as comprising a supporting base 1, upon which is mounted a table 2, and a head member 3, hereinafter described in detail.

*Bead gripping unit A.*

Figure 3:
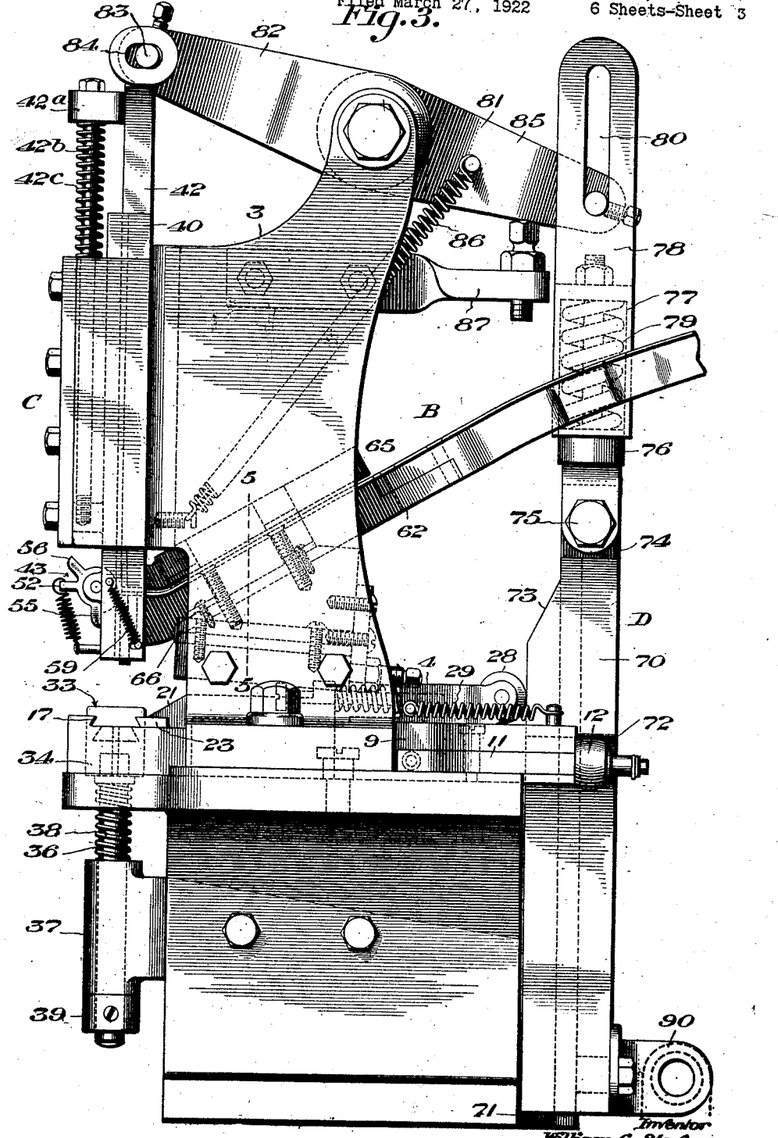
Fig. 3 is a side elevational view of the portion of the machine shown in Fig. 2.
Figure 8:
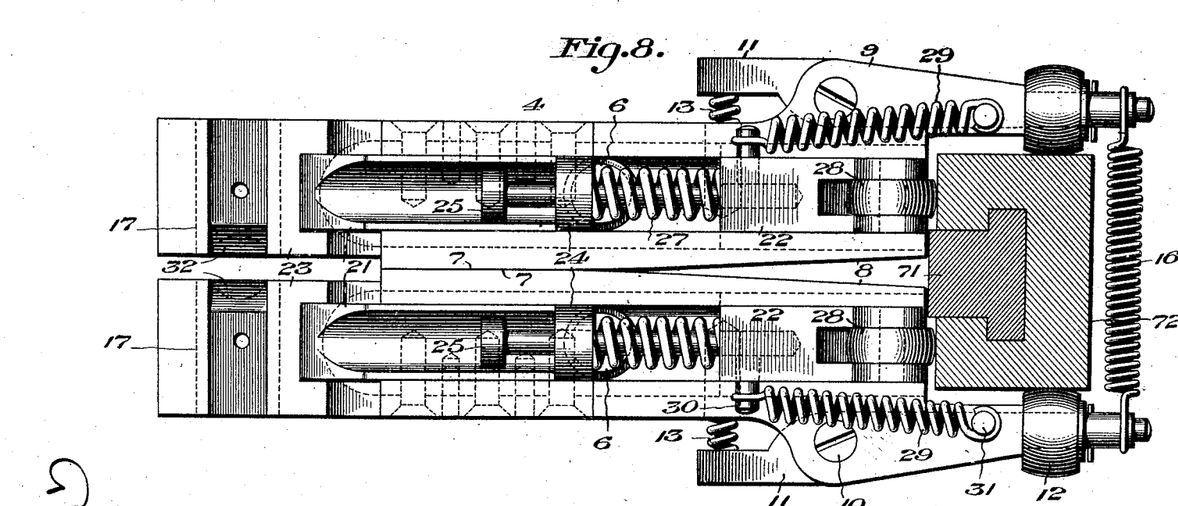
Fig. 8 is a plan view of one of the units of the machine.
Figure 9:
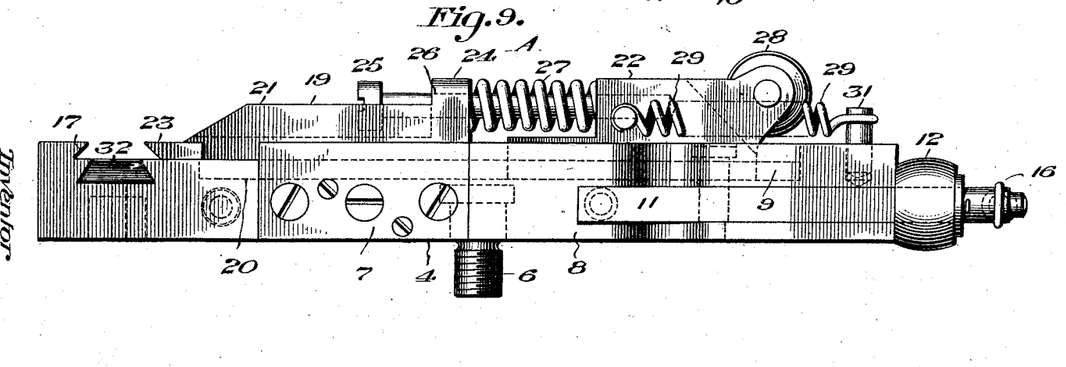
Fig. 9 is a side elevational view of the unit shown in Fig. 8.

The bead gripping unit A as best shown in Figs. 3, 8, and 9 of the drawings, comprises a pair of relatively movable jaws 4 which are respectively pivoted at 6 for swinging movement, in a horizontal plane, upon the table 2. They are designed to swing together at their forward ends to position the ends of a bead strip in substantially abutting relation so that a staple may be driven therethrough while the bead ends are being held in this position. Upon their adjacent sides each jaw is constructed to provide a stop surface 7 whereby the movement of their forward ends toward each other is limited to properly align them, and a second stop surface 8 for limiting the relative movement of their opposite ends toward each other. These surfaces, as best shown in Fig. 8, are angularly arranged upon each jaw whereby said jaws may be disposed in close proximity and still be freely movable about their aforesaid pivots 6. At its rear end each jaw is provided with a laterally offset extension 9 in which is pivotally mounted, as at 10, an arm 11 adapted to carry at its rear end a roller 12. These rollers are actuated by means, hereinafter described, to rock the jaws about their respective pivoted points 6. Attention is directed to the fact that each arm 11 is yieldably mounted relative to its jaw 4 by means of a spring 13, on the forward side of its pivot 10, and that they are normally pulled toward each other by means of a retractile spring 16, for a particular purpose hereinafter set forth. At its forward end each jaw is provided with an undercut portion 17, designed to cooperate with a movable gripper element 18, presently described, to grasp one end of the bead and firmly hold it during swinging movement of the jaws.

The movable gripper elements 18, of which two are provided, comprise respectively a slide 19 mounted in a guideway 20 of their respective jaw 4. Each slide embodies two members 21 and 22 which are yieldably connected together for simultaneous movement in their guideway, and for movement relative to each other. The member 21 is formed at its forward end with an undercut portion 23, designed to cooperate with the aforesaid surface 17 to grip the bead end, and at its rear end with an upstanding ear 24. A bolt 25 extends through an opening 26 in the ear 24 and is threaded at its rear end into the forward end of the member 22 whereby said member 22 is movably connected to the member 21. Coil spring 27 respectively surrounding the bolts 25 intermediate the members 21 and 22 serves to yieldably hold the members in normally spaced relation. Each member 22 at its rear end carries a roller 28 designed to be engaged by the aforesaid means, for actuating the rollers 12, in the manner and for a purpose, presently set forth. Members 22 are normally drawn rearwardly by means of retractile springs 29 which are respectively connected at one end to their associated member as at 30, and at their rear end to their adjacent offset extension as at 31. Intermediate the surface 17 of each jaw and the portion 23 of each gripping element 18, the jaws are provided respectively with a cam surface 32, the surfaces being arranged in opposed relation, and downwardly inclined toward each other, to provide an anvil for clenching the ends of the staple after it is driven through the abutted ends of the bead.

Mounted upon the frame of the table 2 intermediate the jaws and their cam surfaces 32, a stop 33 is provided for spacing the ends of the bead strip and centering them as they are moved together by the jaws 4. In the form shown, this stop comprises an upright finger 34 that projects through a slot 35 in the table 2, and is carried upon a shaft 36. The shaft, in turn, is slidably mounted for vertical movement in a sleeve 37. A coil spring 38 is interposed between the sleeve 37 and the finger 34 to normally hold the finger in a raised position, and to permit it to be compressed when the staple is driven through the ends of the beads as will presently become apparent. At its lower ends the shaft 36 is provided with a collar 39 for limiting the upward movement of the shaft and the finger.

Staple driving unit.

The staple driving mechanism comprises a presser member 40, mounted for vertical movement in guideways 41 provided upon the forward face of the head member 3, a hammer 42 yieldably mounted for vertical sliding movement in the presser member 40, and an oscillatable staple receiving member 43, each of which will now be described in detail.

Figures 5, 6, 7:
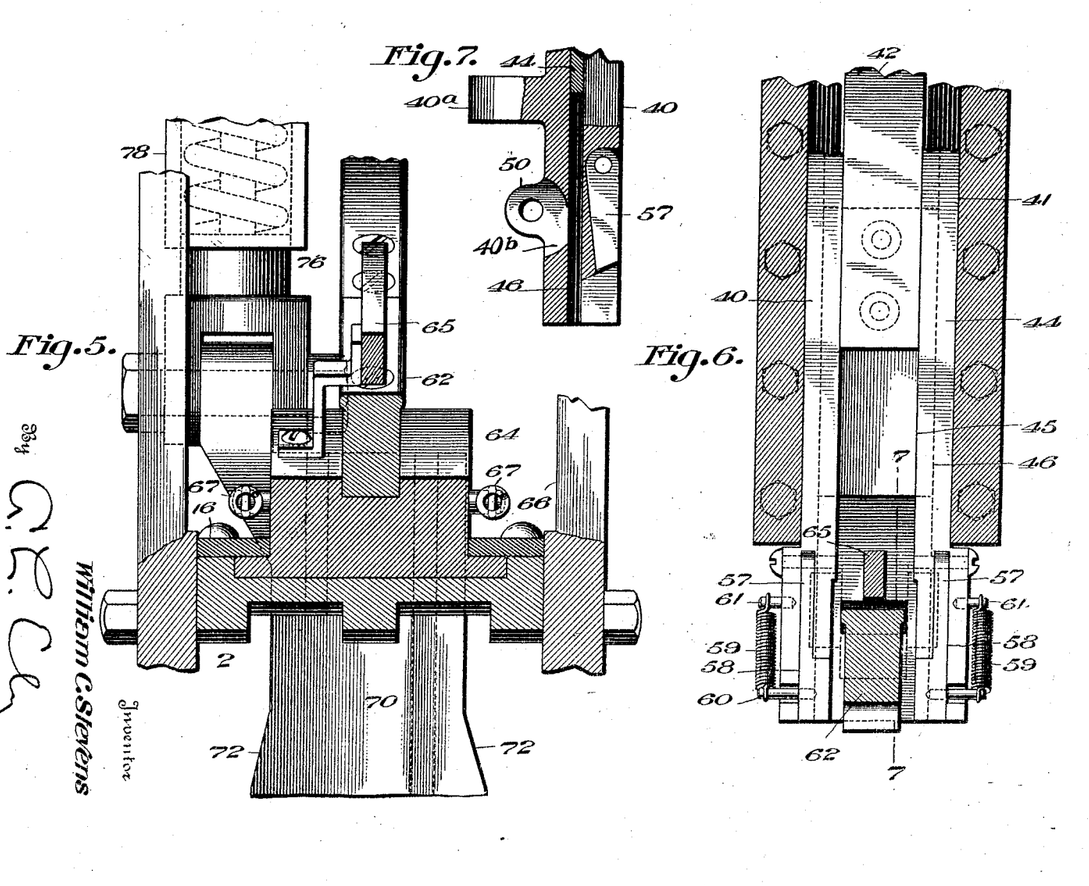
Fig. 5 is a fragmentary sectional view, parts shown in elevation, taken on the line 5—5 of Fig. 3, and drawn to an enlarged scale.
Fig. 6 is a fragmentary sectional view, parts showing in elevation, taken on the line 6—6 of Fig. 4.
Fig. 7 is a sectional view, on the line 7—7 of Fig. 6.

The presser member, see Fig. 6, is constructed in the form of a vertical slide 44 that is open at its rear and provided with two vertical guideways 45 and 46 respectively, the latter being of greater width than the former. Both guideways are coextensive with the height of the member 40, and the latter is disposed substantially centrally of the forward ends of the jaws 4 for a purpose presently apparent. As before intimated the presser member 40 and the hammer 42 are designed to be relatively movable, their functions being respectively to press the ends of the strip against the jaws 4, and to drive the staple while the strip is held in this position. To this end the hammer 42 is provided with a forwardly projecting lug 42$^a$, designed to receive a bolt 42$^b$, which has its lower end threaded into a corresponding lug 40$^a$ provided on the forward face of the presser member 40. An expansion spring 42$^c$ is interposed between said lugs and disposed about the bolt 42$^b$. In this manner the hammer 42 is yieldably held in raised position relative to the presser member 40.

Figure 2:
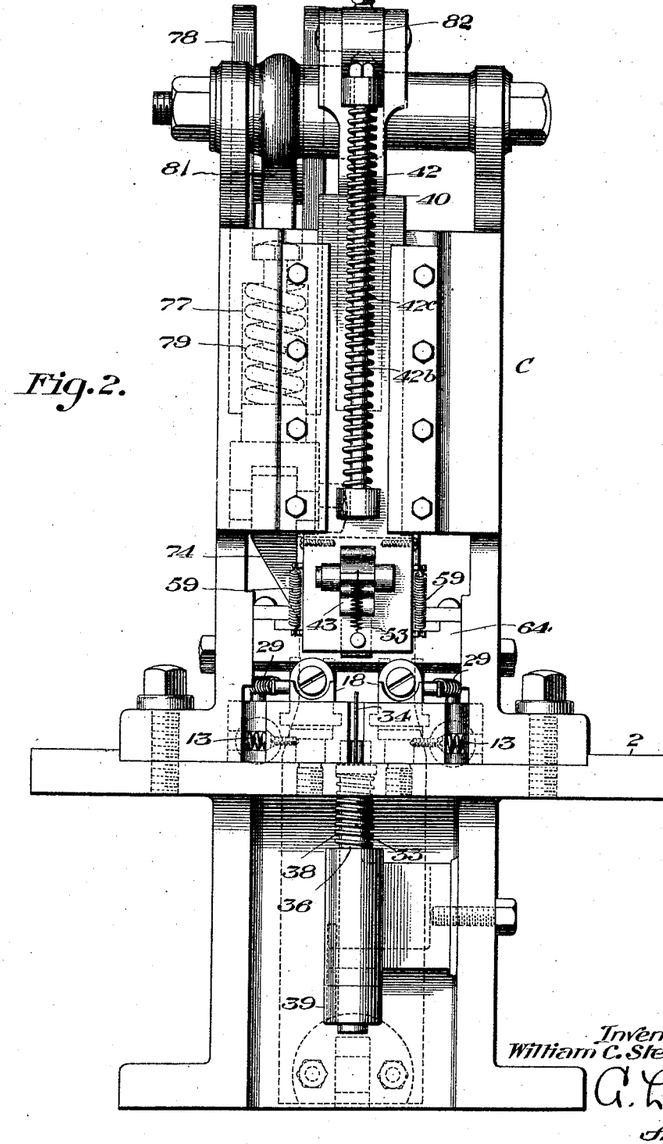
Fig. 2 is a front elevational view, on an enlarged scale, of the upper portion of the machine.

The hammer member 42 comprises a shank portion 42′ slidable in the guideway 45, and a relatively thin hammer head 44 of greater width than the shank 42′ adapted to slide into the wider guideway 46. This construction is provided for cooperation with a peculiar arrangement of staple feeding mechanism, presently described in detail, and for the purpose of properly placing the driving blows of the hammer relative to the ends of the jaws 4 upon which the bead ends are held. As best shown in Fig. 2, the hammer head 44 is designed to travel past the staple receiving member 43, which to this end is constructed and mounted as follows:

It comprises a cam shaped body portion 48 mounted to oscillate upon a pin 49 that extends between spaced ears 50, formed upon the face of the presser member 40. At 51 this member is provided with a rearwardly projecting lip designed to normally protrude in the path of the hammer head 44, through a slot 40ᵇ in the presser member 40, and to receive the staple from the staple feeding mechanism B. In order to normally retain it in position to receive the staple, a lug 52 is provided upon its forward face adapted to receive one end of the coil spring 53, the other end of which is suitably attached as at 54 to the presser member 40. A stop 55 serves to hold it in its normal position and a second stop 56 is provided for limiting its movement when the hammer head 44 delivers the driving stroke. At the lower end of the presser member 40 means are provided whereby the lower end of the guideway 46 may be opened throughout its full width to clear it of any staple that might become jammed therein. This means comprises plates 57 one of which is hinged upon each side of the guideways 45 and 46 in a suitably formed recess 58 provided in the member 40. These plates are respectively offset at their lower ends to provide an extension of the guideway 45, and are retained in seated position in their respective recesses by means of a coil spring 59, one end of which is attached to the plate as at 60. The other end of the spring is attached to the side of the presser member as at 61. Preferably the face of the lower end of each plate forms a continuation of one face of the guideway 46 as best shown in Fig. 7 of the drawings.

*Staple feeding mechanism.*

Figure 4:
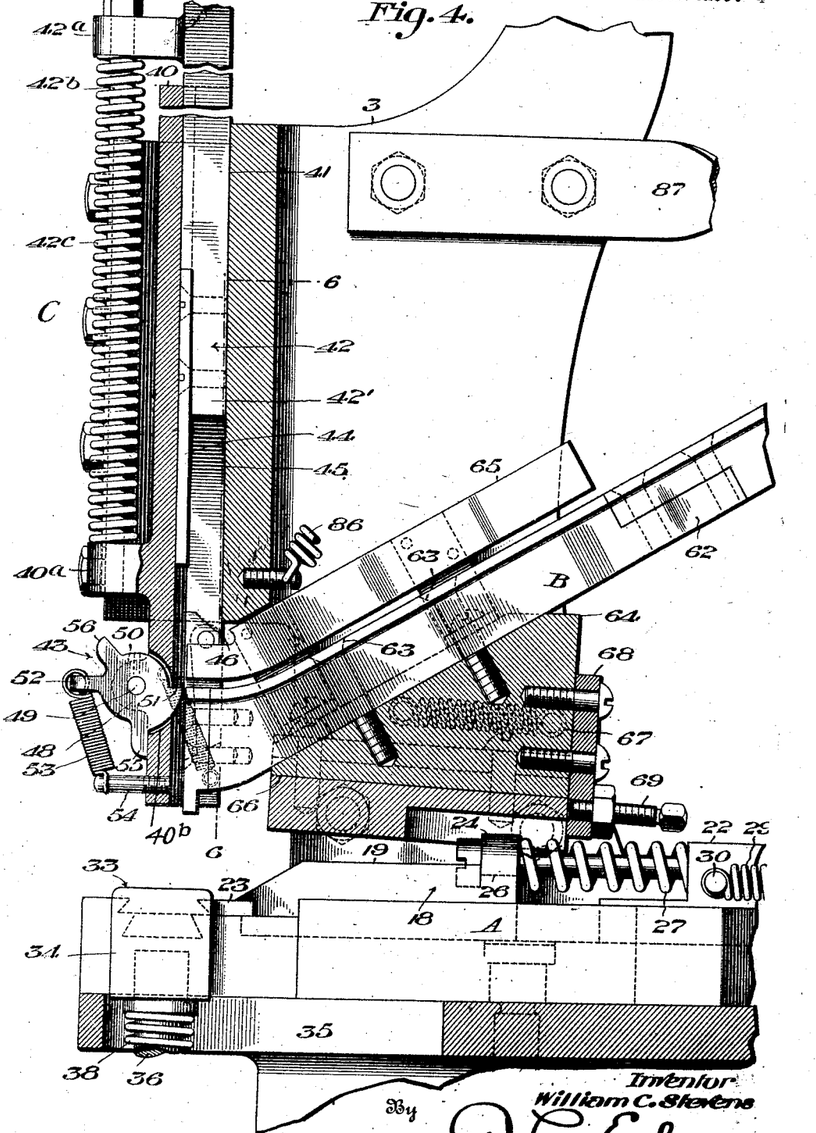
Fig. 4 is a vertical central sectional view, on an enlarged scale, of a portion of the mechanism shown in Fig. 2.

As a means of feeding the staples to the staple receiving member 48, an inclined trackway 62 is utilized, which at its forward end is affixed, as by screw bolts 63, to a carriage 64, mounted for adjustment within the head 3. At its rear end the inclined trackway may be connected in any suitable manner to a source of supply, not shown, such as a hopper or the like, adapted to position the staples astride thereof. The forward extremity of the guideway, in the operative position thereof, is positioned within the guideway 45 of the presser member 40, with its face substantially flush with the rear face of the guideway 46. In this position it is in close proximity to the portion 51 of the staple receiving member 48. Hence the staples will slide directly on the said portion 51 as they gravitate down the inclined rail 62. If desired a guard rail 65 may be provided over the forward end of the rail 62, of the character shown in Figs. 4 and 5 of the drawings.

The carriage 64 is mounted for adjustment in guideways 66 so that it may be moved away from the presser member 40 to withdraw the forward end of the guideway 62 from its operative position. This arrangement is provided in order that access may be had to the lower end of the presser member, and the plates 57 swung rearwardly to permit the operator to remove any jammed staples from the guideway 46. Normally the carriage is held in its operative position by means of retractile springs 67, which have their ends attached respectively to the carriage and to the head 3 as shown by dotted lines in Fig. 4. At the rear of the carriage a depending lug 68 limits the forward movement of the carriage and serves, at its lower end, as a mounting for a set screw 69, positioned to abut against the face of the guideway 66, whereby the carriage may be adjusted in a manner which will be obvious.

*Driving mechanism.*

As previously stated, a mechanism is provided for actuating the bead gripping unit A and the staple driving unit B. This mechanism, as best shown in Figs. 3 and 5 of the drawings comprises a vertically movable cam bar 70 mounted upon a guide 71 which is arranged in a position intermediate the rear ends of the jaws 4. At suitable points upon the sides of the bar 70 cam faces 72 are provided to engage the rollers 12 and spread them apart when the cam bar moves upwardly. Upon its forward face a cam surface 73 is also provided upon the bar 70, in such position thereon that the rollers 28, on the slides 18, will be engaged and moved forward upon the jaws 4 prior to the engagement of the rollers 12 by the cam surfaces 72. The relative arrangement of the cam faces 72 and 73 is best shown in Fig. 3 of the drawings.

At its upper extremity the cam bar 70 is laterally offset as at 74 and provided with a pivotal connection 75 to a plunger 76 adapted to be received in a chamber 77 of a forked member 78. A coil spring 79 is interposed between the plunger 76 and the upper end of the chamber 77, whereby the bar 70, and the forked member 78, are yieldably connected for a purpose presently apparent. The forked member 78 is slotted in a vertical direction as at 80 for free pivotal connection with the rear end of a rocker arm 81.

Rocker arm 81 is pivotally mounted between the sides of the head member 3. It is provided with a forward end portion 82 disposed in the median line of the head 3 and pivotally connected at its forward extremity to the hammer shank 43 by a pin 83. The pin 83 is received in a slot 84 in the shank. The rear end of the arm 81 is offset as shown in Fig. 2 to align it with the forked member 78 and the plunger 76. Normally the rear end of the arm 81 is drawn downwardly by means of a retractile spring 86, and a stop 87 is provided for limiting such downward movement thereof. Stop 87 and spring 86 also serve to limit the upward movement of the hammer 42 and the presser member 40, to normally hold them in proper position for the driving and pressure stroke and to normally place the staple receiving element 48 in proper position relative to the guideway 62.

Figures 1, 10:
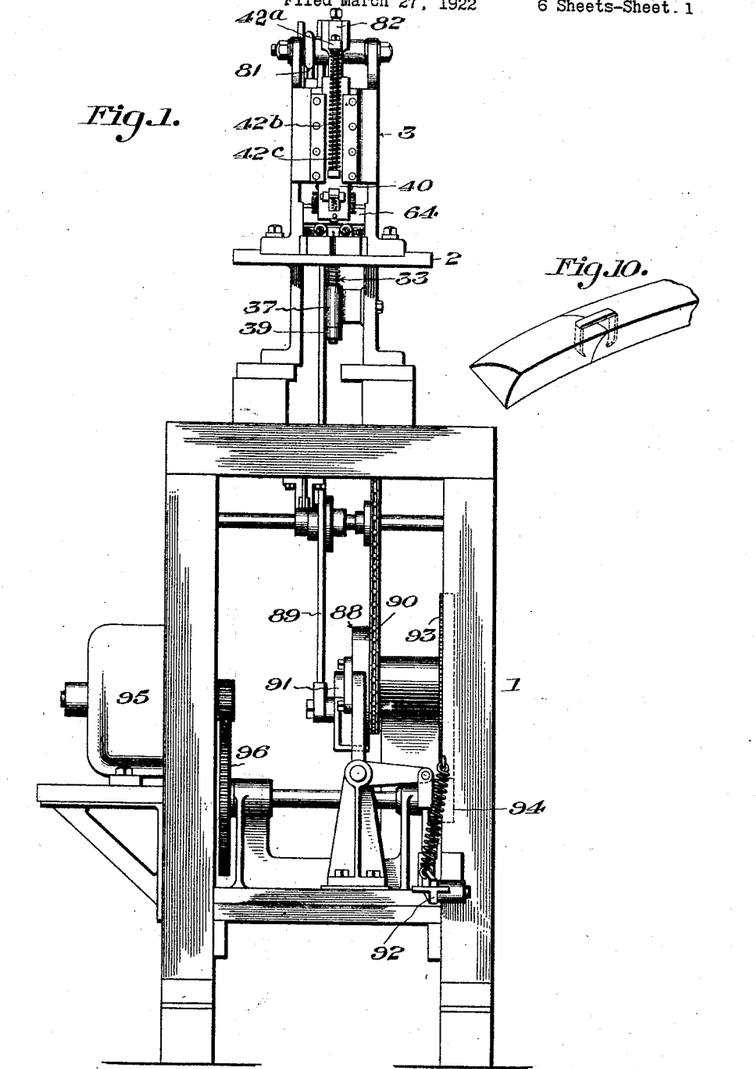
Fig. 1 is a front elevational view of a machine constructed in accordance with my invention.
Fig. 10 is a fragmentary view of the connected portions of a bead.

Any suitable form of mechanism may be provided for reciprocating the cam bar 70, such for instance as that shown in Fig. 1 of the drawings. As therein shown I have elected to utilize a well known type of single revolution clutch 88 which is connected by a pitman 89 to the lower end of the cam bar 70 as shown at 90 by dotted lines in Fig. 3 of the drawing. In describing the clutch 88 it is sufficient to say that it comprises a continuously driven member 90 and a free member 91 to which latter the aforesaid pitman 89 is connected, and that the members 90 and 91 may be clutched or released from each other in any suitable manner, for instance by the foot treadle 92. Member 90, in the present instance, is driven by means of a gear wheel 93 meshing with a pinion 94, which is in turn driven from a motor 95 through a train of gears 96.

Operation.

The operation of the machine is as follows: The staples upon the guideway 62 will gravitate toward the staple receiving member 48, one of said staples being received upon the protruding portion 51 of said element, and thereby held in the path of the hammer head 47. The operator now places the ends of the bead upon the jaws 4 in the space between the surface 17 and the portion 23 of the member 21. The treadle 92 is now depressed and the clutch element 90 describes a single revolution whereby the cam bar 70 is first raised upon the guide 71. This action of the bar 70 first brings the cam surface 72 into engagement with the rollers 28 and moves the members 21 and 22 forward whereby the portions 23 grip the bead ends between their undercut surfaces and the surface 17. It will here be noted that the yielding arrangement of the members 21 and 22 permits various sizes of beads to be gripped and prevents mutilation of the bead during such action. The cam surfaces 72 next engage the rollers 12, and swing the jaws 4 about their pivot 6, so that their forward ends are brought together, and the ends of the beads thus carried together in substantially abutting relation against the finger 34, previously described. In this position the ends of the beads are directly over the inclined surfaces 32. Continued upward movement of the bar 70 rocks the arm 81 about its pivot upon the head 3 and depresses the hammer 42 which carries with it by means of the spring 45, the presser head 40 and the staple receiving member 48. The presser head 40 is thus first brought into yielding engagement with the ends of the bead strip, and a staple lowered into position directly over said ends thereof. Further movement of the bar 70 depresses the hammer 42 in the presser member 40, which latter element at this point in its operation is, of course, stationary, and the hammer head 44 strikes the staple on the portion 51 of the member 48. The blow of the hammer head 44 rotates the member 48 against the action of the spring 53, and displaces the portion 51 from the guideway 46 leaving the staple in an upright position, between the forward end of the trackway 62 and the forward wall of the guide rail 45. From this position it is immediately driven into the ends of the beads and astride the finger 34. As the hammer head 44 drives the staple home its ends contact the cam surfaces 32 and are clenched in substantially the manner and position shown in Fig. 10. Obviously the finger 34 will be depressed against the action of its spring 38 as the staple is driven home.

Upon the last half of the revolution of the clutch element 90 the bar 70 is lowered. This action releases the rear end of the arm 81 which is then lowered by the action of the spring 86. Spring 86 is initially aided by the action of spring 42° which tends to force the hammer 42 upwardly until said hammer has been raised sufficiently to clear the presser member from the bead ends. As the rear end of the arm 81 engages the stop 86, the presser head and hammer assume their starting position and the staple receiving member 48 is rotated by the action of the spring 53 into position to again receive staples from the guide rail 62. Continued downward movement of the bar 70 successively withdraws the cam surfaces 72 and 73 from engagement with the rollers 12 and 28 whereupon the springs 16 separate the forward ends of the jaws 4 and the springs 29 permit the gripper elements 18 to retract in position to grip the next bead strip, positioned upon the jaws. By virtue of the previously described yielding relation of each arm 11 relative to its jaw 4 a safety device is provided whereby, should an obstruction tend to hold the jaws 4 against movement, in any degree, the arms 11 are free to move independently of their respective jaw upon the upstroke of the cam bar 70. This construction effectively prevents breaking of these particular parts, as well as the clutch mechanism, in the event of the aforesaid contingency arising. It is to be understood, however, that the springs 13 are of the required strength to space each arm 11 and its respective jaw in proper relation during normal operation of the machine. As before intimated the yielding relation between the members 21 and 22 of each gripper element 18 also provide for safe operation of the gripper elements, whereby they are prevented from jamming and mutilating the beads. Preferably the springs 27 are of such strength that although they afford the requisite pressure to effectively clamp the bead, the operator may at any time, when the presser member 40 and hammer 42 are raised, remove the bead from between the surfaces 17 and the portions 23 by an upward lift of the bead.

Although I have described my invention in detail, and therefore necessarily utilized certain specific language and terms, it is to be understood that the present disclosure is illustrative in nature and not to be construed as imposing any limitations upon the spirit or scope of the invention unless otherwise expressly indicated in the claims appended hereto.

I claim:

1. Mechanism for stapling the ends of a flexible strip together comprising, mechanism adapted to grip the ends of the strip and to move the ends of the strip in substantially abutting relation, said mechanism comprising movable devices each carrying relatively movable jaws, means for receiving and conveying a staple into driving position relative to the ends of the strip, means for feeding staples to said receiving and conveying means and mechanism for driving the staple.

2. Mechanism for stapling the ends of a flexible strip together comprising, mechanism including pivoted devices each carrying relatively movable jaws adapted to grip the ends of the strips, to move the ends of the strip into substantially abutting relation and to support the abutting ends in position for stapling, means for receiving and conveying a staple into driving position relative to the ends of the strip, means for feedings staples to said receiving and conveying means and mechanism for driving the staple.

3. Mechanism for stapling the ends of a flexible strip together comprising, cam actuated devices including members each carrying relatively movable jaws adapted to grip the ends of the strip and to move the ends of the strip into substantially abutting relation, means for receiving and conveying a staple into driving position relative to the ends of the strip, means for feeding staples to said receiving and conveying means and mechanism for driving the staple.

4. Mechanism for stapling the ends of a flexible strip together comprising, mechanism adapted to grip the ends of the strip and to move them so that they will be held in substantially abutting relation, a combined presser and hammer unit operable to press the ends of the strip into driving position relative to the hammer, and means for operating the combined presser and hammer unit.

5. Mechanism for stapling the ends of a flexible strip together comprising, mechanism adapted to grip the ends of the strip and to move them so that they will be held in substantially abutting relation, a combined presser and hammer unit adapted to press the ends of the strip and drive a staple therein, means associated with the mechanism for centering the ends of the strip relative to said unit, and means for feeding staples in driving position relative to the hammer.

6. Mechanism for stapling the ends of a flexible strip together comprising, a combined presser and hammer unit adapted to press the ends of the strip and drive a staple therethrough, a mechanism adapted to grip and to move the ends of the strip into substantially abutting relation, and means associated with said mechanism for centering the ends of the strip relative to the unit.

7. Mechanism for stapling the ends of a flexible strip together comprising, a reciprocable driving unit embodying a presser member and a hammer head arranged to successively press the strip and deliver a driving blow thereagainst, mechanism adapted to grip and to move the ends of the strip so as to support the ends of the strip into substantially abutting relation and in line with said driving unit, means carried upon the presser member for receiving and placing a staple in driving position relative to the strip, and means for feeding staples to said first means.

8. Mechanism for stapling the ends of a flexible strip together comprising, a reciprocable driving unit embodying a hammer head and a presser member yieldably mounted thereon, means mounted upon the presser member for receiving and placing a staple in driving position relative to the strip, cam actuated gripper elements adapted to grip and move the ends of the strip together so as to support the ends of the strip in substantially abutting relation and in line with said unit, and devices associated with the gripper elements for centering the strip ends relative to the driving unit.

9. Mechanism for stapling the ends of a flexible strip together comprising, a reciprocable driving unit embodying a hammer and a presser member yieldably mounted thereon, a centering device disposed in alignment with the driving unit, and means adapted to grip and move the ends of the strip together and against opposite sides of the centering device.

10. Mechanism for stapling the ends of a flexible strip together comprising, a reciprocable driving unit embodying a hammer and a presser member yieldably mounted thereon, means mounted upon the presser member for receiving and placing a staple relative to the strip, a centering device disposed in alignment with the driving unit, and means adapted to grip and move the ends of the strip together and against opposite sides of the centering device.

11. Mechanism for stapling the ends of a flexible strip together comprising, a reciprocable driving unit embodying a hammer and a presser member yieldably mounted thereon, means mounted upon the presser member for receiving and placing a staple relative to said strip, a centering device disposed in alignment with the driving unit, and cam actuated gripper devices adapted to move the ends of the strip together against the centering device.

12. Mechanism for stapling the ends of a flexible strip together comprising, staple driving means, and means to grip and support the ends of the strip in staple receiving position, said means including a plurality of pivoted jaws having an undercut portion to engage one side of the strip, movable gripper elements to engage the other side of the strip, and means to yieldingly force the elements toward said portion.

13. Mechanism for stapling the ends of a flexible strip together comprising, staple driving means, and means to grip and support the ends of the strip in staple receiving position, said means including a plurality of pivoted devices having relatively movable jaws thereon, gripping means carried by said jaws, means to cause the jaws to clamp the ends of the strip, and means to rock the devices about their pivots to bring the ends of the strip into abutting relation.

14. Mechanism for stapling the ends of a flexible strip together comprising, a plurality of pivoted jaws having stationary strip clamping elements thereon, movable clamping elements arranged to cooperate with said stationary elements to grip the ends of the strip, means for yieldingly forcing the said elements together, means for rocking the said jaws about their respective pivots to bring the ends of the strip into abutment, and means for fastening the ends while so held.

15. A machine of the class described having in combination, a plurality of members mounted for pivotal movement in a horizontal plane, operating means to rock the members about their pivots and cause the ends thereof to approach and retreat from one another, said operating means including a non-rigid connection, cooperating cam surfaces upon the members for limiting the movement thereof, a horizontally reciprocable slide carried by each of said members, means on the slides for gripping the ends of a flexible strip, means for causing the gripping means to engage the strip with a yielding pressure, and stapling means to secure the ends of the strip together.

16. A machine for stapling the ends of a flexible strip together comprising, staple driving means, a support for the ends of the strip, said support comprising cam actuated gripper devices adapted to move the ends of the strip together, and a centering device disposed in alignment with the driving means and projecting above the support in the path of the ends of the strip, said centering device being constructed and arranged to retreat below the strip prior to the stapling operation.

17. A machine for stapling the ends of a flexible strip together comprising, staple driving means, means adapted to grip and move the ends of a strip together, a reciprocable centering device disposed in alignment with the driving means and constructed to locate the ends of the strip in proper position to receive a staple, and yielding means for normally retaining the centering device in operative position.

WILLIAM C. STEVENS.